United States Patent Office 3,134,261
Patented May 26, 1964

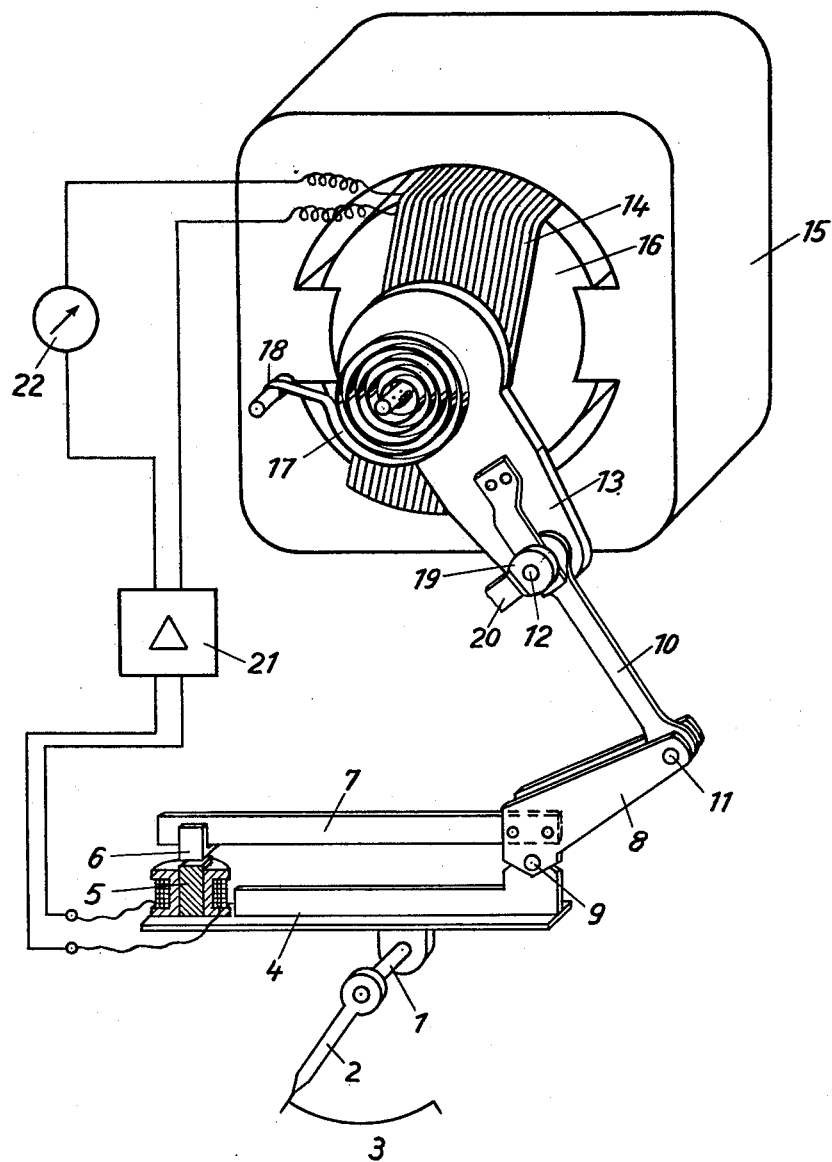

3,134,261
TRANSDUCER WITH SQUARE ROOT
EXTRACTION
Adolf Krüssmann and Edmund Freitag, both of Minden, Westphalia, Germany, assignors to Schoppe & Faeser G.m.b.H., Minden, Westphalia, Germany, a limited-liability company of Germany
Filed Oct. 10, 1961, Ser. No. 147,700
Claims priority, application Germany Oct. 20, 1960
5 Claims. (Cl. 73—398)

For remote measurement of the rate of flowing fluid and gases transducers are known supplying a proportional impressed current according to the quantity of a substance flowing through a Venturi tube or through a diaphragm per unit of time. These transducers consist of a differential pressure gauge connected at both sides of the diaphragm or throat and mouth of the Venturi in known manner, and a device for converting the differential pressure measured by the differential pressure gauge into an impressed electric current. Systems practically without directive force are used predominantly as differential pressure gauge coupled to an electro-dynamic measuring instrument either direct or across transmission links. A sensing element influenced by the position of the system without directive force controls an electronic or magnetic amplifier whose output current flows through the coils of an electro-dynamic system. The force produced by the amplifier output current in the coils of the electro-dynamic system counteracts the force produced by the differential pressure at the input measuring system, that force being consequently cancelled. The current required for compensation of the force of the differential pressure gauge is then proportional to the square root of the differential pressure and consequently proportional to the rate of flow of the substance flowing through the constriction. This enables measurement and remote transmission by connecting electric measuring instruments in series with the electro-dynamic system. Known systems are more complicated because the force exerted on the movable element of the differential pressure gauge must be compensated by the measuring current itself. It is necessary, for instance, to provide an expensive amplifier for supplying the output current. If the coils of the electro-dynamic system are to be of small dimensions and as light as possible it is necessary to insert between the differential pressure gauge and the electro-dynamic system a bulky, complicated and delicate lever transmission causing errors due to friction or hysteresis of the bearing. For producing adequate compensation there is a disadvantageous increase of the setting time.

Known transducers with a differential pressure measuring system without bias or directive force and with force compensation furthermore have the disadvantage that in case of failure of the auxiliary apparatus the input measuring instrument does not show any indication. Consequently in case of failure of the auxiliary apparatus it is not possible to evaluate the indication of the measuring instrument for manual control.

For flow measurement also differential pressure gauges are used having a measuring system without bias or directive force and which therefore produce a deflection depending on the differential pressure. For remote transmission of the measuring quantity the movable element of such a differential pressure gauge can be coupled to an electric teletransmitter, e.g. a potentiometer or inductive transmitter specifically a differential transformer. The deflection of the differential pressure gauge being proportional to the differential pressure and consequently to the square of the rate of flow to be measured. In many cases a square root extraction linkage, e.g. a linkage (1—cos α) designed as toggle link is inserted between the differential pressure gauge and the electric teletransmitter. However known differential pressure gauges with square root extraction linkage are extremely delicate and complicated as concerns adjustment if they are supposed to be sufficiently accurate also within the lower part of the measuring range. The forces produced by the measuring system within the lower part of the range are extremely small, whereas the square root extraction linkage due to its kinematic rating within this particular range requires maximum force for overcoming the friction.

These disadvantages of known transducers are avoided by the construction of the present invention. The invention is a transducer for converting the deflection of a differential pressure measuring instrument into an electric current as a function of the square root of the deflection. The invention is characterized by a resilient electric measuring instrument connected either to the output voltage or to the output current of the amplifier, said instrument across a squaring linkage following up the deflecting element of the differential pressure measuring system to the sensing element controlling the amplifier.

Further details on the invention are shown in the drawing. For a differential pressure responsive device, a known type of membrane or bellows instrument (not shown except for its pointer and shaft or axle) having a biasing spring for producing the directive force can be used. The axle of this measuring system is designated with 1 with pointer 2 fastened to it and which moves on scale 3. At the pointer shaft 1 support 4 is fixed carrying coil 5 of small inductive sensing means. Another supporting bar 7 is connected as nearly friction free as possible to supporting bar 4 by bearing 9. Core 6 connected to supporting bar 7 constitutes the inductive sensing means together with coil 5. Furthermore arm 8 is connected rigidly to supporting arm 7. An electric moving coil instrument with elastic suspension is coupled to this arm across an elbow joint. The moving coil instrument consists of magnet 15 and the inner core 16 with an air gap in between as well as movable coil 14 within the air gap. The moving coil instrument can also be designed as core magnet instrument and in this case 16 is the core magnet and 15 the iron cylinder. The moving coil 14 is biased to attain a given position by a spiral spring 17 having its outer end fixed as at 18. The elbow joint coupling supporting arms 7 and 8 to moving coil 14 consists of levers 10 and 13, the latter being connected direct to moving coil 14 and hinged to each other by joint 12. Lever 10 is connected to arm 8 by linked bearing 11. Adjustable stop means 19 and 20 prevent the moving coil instrument from assuming complete zero position and enables deflection in one direction only. Coil 5 of the inductive sensing means is connected to amplifier 21 feeding its output current to moving coil 14. The electric instrument 22 intended for reading the value measured is connected in series with moving coil 14. It is possible to connect in series with coil 14 additional electric measuring instruments, integrators or controllers because due to the inductive sensing means the amplifier 21 is controlled in such a manner that irrespective of the load it supplies an impressed current as a function of the value measured.

In operation, assume a pressure change so as to cause an anticlockwise movement of the pointer 2.

Coil 5 of the inductive sensing means is moved downward and removed from the core of the inductive sensing means. Rotation of shaft 1 simultaneously results in lifting of bearing 9 by which supporting arms 4 and 7 are linked to each other. Due to the lever action, also core 6 of the inductive sensing means is urged upward and removed further from coil 5. The control signal generated in the inductive sensing means arrives at amplifier 21 whose output current flows through coil 14 and turns same. The deflection of coil 14 is transmitted to supporting arm 7 by the elbow joint consisting of levers 10 and 13 and arm 8 so that core 6 of the inductive sensing means is followed up to coil 5 of same. Due to the elastic suspension of moving coil instrument 14 an electric current is required for maintaining coil 14 in the position in which core 6 of the inductive sensing means is followed up to coil 5. This current is proportional to the required deflection of moving coil 14. However since a squaring linkage is inserted between supporting arm 7 carrying inductive sensing means 6 the deflection and consequently the current in moving coil 14 are proportional to the square root of the deflection of shaft 1 of the input measuring instrument with pointer 2. The construction of the transmission link with arm 8 hinged to the support 4 enables the transducer to be made compact enough to be put in a case of small dimensions.

Stop 20 is adjusted preferably in such a manner that the moving coil system cannot return exactly to zero position. In this way core 6 of the detecting element of coil 5 connected to shaft 1 cannot follow to the zero position of the differential pressure measuring system so that elements 5 and 6 of the detecting element controlling the amplifier assume a certain distance from each other if the differential pressure measuring system is in zero position. In this way the output current of amplifier 21 is influenced for obtaining reliably zero if the differential pressure measuring system is in zero position. For measuring instruments with square root extraction the lower part of the range in the vicinity of the zero point is generally not of interest. Consequently stop 20 can also be disposed in such a manner that in case of a decrease of the flow to be measured below a definite minimum value, e.g. 5% the output current of the amplifier becomes zero. It was found that this arrangement does not have the disadvantages of known transducers. Even in case of current failure the value measured is indicated by the position of pointer 2 on scale 3 which is not the case with known transducers with direct force compensation by an electro-dynamic measuring system. The shown arrangement also does not have the disadvantages of electro-dynamic measuring systems and their measuring errors. The setting time of the device covered by the invention is considerably shorter than that of known transducers with square root extraction. The shown arrangement however also has the required accuracy within the lower part of the measuring range contrary to known deflection instruments with squaring system and electric teletransmitter. The input measuring system of the present invention also need not produce considerable force in the vicinity of the zero point for overcoming the friction of the elbow joint because the latter is moved by moving coil 4 actuated by the auxiliary force. At the output of amplifier 21 sufficient force is available for moving the elbow joint.

We claim:

1. Electric transducer for converting the deflection of a differential pressure measuring instrument into an electric current depending on the square root of the deflection or an electric voltage depending on the square root of the deflection, said transducer comprising electric means including both a moving coil and a spring exerting a mechanical torque on the coil and for producing a movement of the coil proportional to current applied to the coil, a squaring mechanical transmission means, an electromechanical sensing system consisting of two elements, one of said elements being connectable to the movable part of the differential pressure measuring instrument and the other being actuated by the moving coil through the squaring mechanical transmission means to follow the movements of said one element, and an amplifier controlled by the electromechanical sensing system and whose output current feeds the moving coil of the electric means, said electric means being responsive to the spacing of said one and said other elements.

2. Electric transducer for converting the deflection of a differential pressure measuring instrument into an electric current depending on the square root of the deflection or an electric voltage depending on the square root of the deflection, consisting of a movable member and a spring exerting a torque on the member with electric means for producing a movement of the member proportional to an applied current, a squaring mechanical linkage, an electromechanical sensing system consisting of two elements, one of said elements being connectable to the movable part of the differential pressure measuring instrument and the other being actuated by the movable member through the linkage to follow the movement of said one element, and an amplifier controlled by the electromechanical sensing system and whose output current feeds the electric means, said electromechanical sensing system being responsive to the spacing of said one and said other elements.

3. In combination, a moving coil instrument having an armature and radial element fast thereon and biased to turn; a turnable shaft whose position is dependent on pressure; first and second elongated hinge members pivoted together at one end and having at the other end inductor means responsive to opening and closing movement of the members, the first of said members being fast on the shaft and transverse thereto, the second member having an arm fast thereon at the pivot end; a toggle joint connecting the outer respective ends of the element and arm; an electrical amplifier interposed between the inductor means and the coil of the moving coil instrument for amplifying output from the inductor means to said coil and a senser responsive to the amplified output to the coil, said member's arm and toggle joint being proportioned to each other so that the senser responds directly to the square root of the position of said shaft.

4. A transducer for converting change of deflection of a pointer and axle carrying the pointer responsive to a differential pressure change into a change of voltage proportional to the square root of said deflection, said transducer comprising a moving coil instrument having a coil for turning; a pointer-like radial element fast with respect to the coil and substantially radial to the axis about which the coil turns; spring bias means for tending to turn the coil to zero position; an inductor and support therefor mounted on said axle to turn with the axle and a follow up element hinged to the support and inductively cooperating with the inductor; an elbow joint having one arm fixed on the follow-up device and the other arm pivotally connected to said radial element to form a toggle, said inductor support, the follow-up element, arms and radial element being so proportioned that when the axle is turned and the toggle is nearly aligned, and the inductor in substantially following up position, angular movement of the coil is substantially proportional to the square root of angular movement of the axle; an amplifier having the input thereof connected to the inductor and the output to the coil, and electric metering means interposed between the amplifier and the coil for indicating in electrical units the force exerted on the spring means to maintain the follow up device adjacent the inductor.

5. A transducer as claimed in claim 4 and a stop near the pivotal connection of the elbow arm to the radial element to prevent the bias means from moving the toggle past dead center.

References Cited in the file of this patent

UNITED STATES PATENTS

| | | |
|---|---|---|
| 2,557,856 | Angst et al. | June 19, 1951 |
| 2,847,625 | Popowsky | Aug. 12, 1958 |
| 2,851,644 | Ferguson | Sept. 9, 1958 |
| 2,905,875 | Fielden | Sept. 22, 1959 |
| 3,061,824 | McLemore | Oct. 30, 1962 |